(No Model.)

C. H. ADAMS.
COMBINED FERRULE AND BUSHING.

No. 550,314. Patented Nov. 26, 1895.

WITNESSES
H. F. Lamb
S. V. Richardson.

INVENTOR
Charles H. Adams
By
A. M. Wooster
Atty.

ANDREW B. GRAHAM. PHOTO-LITHO. WASHINGTON, D.C.

UNITED STATES PATENT OFFICE.

CHARLES H. ADAMS, OF GRAND HAVEN, MICHIGAN.

COMBINED FERRULE AND BUSHING.

SPECIFICATION forming part of Letters Patent No. 550,314, dated November 26, 1895.

Application filed August 14, 1895. Serial No. 559,240. (No model.)

*To all whom it may concern:*

Be it known that I, CHARLES H. ADAMS, a citizen of the United States, residing at Grand Haven, in the county of Ottawa and State of Michigan, have invented certain new and useful Improvements in a Combined Ferrule and Bushing; and I do hereby declare the following to be a full, clear, and exact description of the invention, such as will enable others skilled in the art to which it appertains to make and use the same.

My invention has for its object to provide a combined ferrule and bushing which shall be adapted to the various uses in which it is required that an article of this class shall be rigidly secured to a piece of wood, so as not to turn thereon unless sufficient power is applied to fracture the wood itself, and which shall not be removable therefrom by any power that it is practicable to apply. With this end in view I have devised the novel combined ferrule and bushing, of which the following description, in connection with the accompanying drawings, is a specification, numbers and letters being used to designate the several parts.

Figure 1:
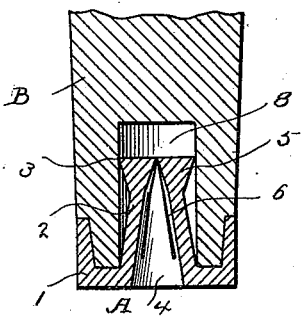
Figure 2:
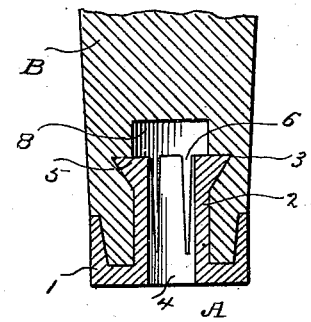
Figure 3:
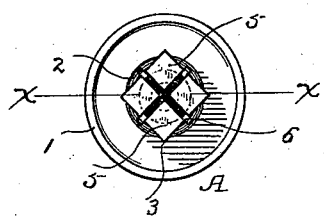
Figure 4:
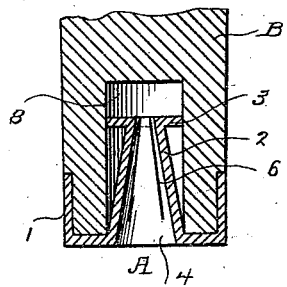
Figure 5:
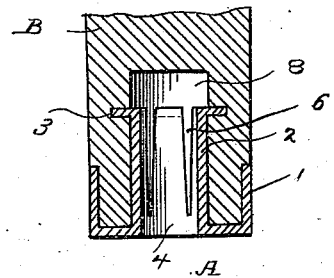
Figure 6:
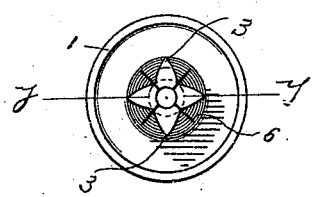
Figure 7:
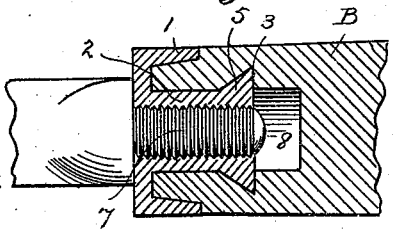

Figure 1 is a sectional view illustrating my novel ferrule and bushing when cast in a single piece, the bushing being in position in a piece of wood—as, for example, a handle or a furniture-leg—but not locked in place; Fig. 2, a similar view illustrating my novel ferrule and bushing locked in place in a piece of wood; Fig. 3, a plan view of my novel ferrule and bushing detached, showing the locking-lugs in the position they occupy before being pressed inward into position for insertion; Fig. 4, a view similar to Fig. 1; and Fig. 5 is a view similar to Fig. 2, illustrating my novel ferrule and bushing when blanked out from sheet metal and then drawn to shape; Fig. 6, a view similar to Fig. 3, but showing the locking-lugs pressed inward into position for insertion, as in Fig. 4; and Fig. 7 is a view similar to Fig. 2, but showing the bushing as provided with an internal screw-thread to receive a correspondingly-threaded member.

A denotes my novel combined ferrule and bushing, which may be cast in a single piece, as illustrated in Figs. 1, 2, 3, and 7, or drawn from a disk of sheet metal, as in Figs. 4, 5, and 6, and B the article or piece of wood to which it is attached, said article being provided with an opening 8 to receive the bushing.

My novel device consists, essentially, of a ferrule 1, adapted to engage the wood externally, and a bushing, which is adapted to engage the wood internally, and is slotted vertically, so as to form independent arms 2, each of which is provided at its upper end with an outwardly-turned locking-lug 3.

In the form illustrated in Figs. 1, 2, 3, and 7 the combined ferrule and bushing is cast in a single piece. The central opening, which I have designated by 4, may be cast therein, or the casting may be drilled afterward. The locking-lugs are formed by providing the bushing with a head, which I have indicated by 5, and splitting the head to form the locking-lugs by means of slots 6 formed therein. When the proper quality of metal is used, these grooves may be cast in the bushing, thus dispensing with the operation of slotting afterward.

In the form illustrated in Figs. 4, 5, and 6 my novel ferrule and bushing is drawn from a disk of metal, the upper end of the portion forming the bushing remaining closed, of course, at the end of the drawing operation. Another operation cuts off the upper end of the bushing and slots it, and the same or a succeeding operation turns the upper end of the sections of the bushing outward, as clearly shown, to form the locking-lugs. The sections of the bushing are sprung inward, as in Fig. 6, in which position the bushing is inserted in place in the piece of wood to receive it. The operation of attaching the ferrule in place where the interior of the bushing is smooth is completed by driving a mandrel in from the lower end, which forces the locking-lugs from the position shown in Figs. 1 and 4 to the position shown in Figs. 2 and 5, thereby locking the combined ferrule and bushing firmly in place and preventing it from being either turned or withdrawn without fracturing the piece of wood to which it is attached.

In Fig. 7 I have shown the interior of the bushing as threaded to adapt it to receive a correspondingly-threaded member, which I have indicated by 7.

Having thus described my invention, I claim—

A combined ferrule and bushing consisting of a ferrule adapted to engage a piece of wood externally and a bushing formed integral therewith and adapted to engage the wood internally, said bushing consisting of arms which are provided with outwardly turned locking lugs, said locking lugs being adapted to be compressed inward to permit insertion of the bushing in the piece of wood and then pressed outward and driven into the wood thereby locking the ferrule and bushing against turning or removal.

In testimony whereof I affix my signature in presence of two witnesses.

CHARLES H. ADAMS.

Witnesses:
JAMES G. HALLAS,
FRANCIS KANE.